United States Patent
Maruo et al.

[11] Patent Number: 5,853,351
[45] Date of Patent: Dec. 29, 1998

[54] METHOD OF DETERMINING AN OPTIMUM WORKLOAD CORRESPONDING TO USER'S TARGET HEART RATE AND EXERCISE DEVICE THEREFOR

[75] Inventors: Katsuhiko Maruo, Ikeda; Akiko Ono, Itami; Mototaka Nagai, Osaka; Satsuki Saeki, Kyoto, all of Japan

[73] Assignee: Matsushita Electric Works, Ltd., Osaka, Japan

[21] Appl. No.: 151,879

[22] Filed: Nov. 15, 1993

[30] Foreign Application Priority Data

Nov. 16, 1992 [JP] Japan ................................. 4-305643
Dec. 22, 1992 [JP] Japan ................................. 4-342895

[51] Int. Cl.$^6$ ................................. A63B 69/00
[52] U.S. Cl. ................................. 482/8
[58] Field of Search ................ 482/1–9, 57, 900, 482/901; 128/707, 774; 73/379.01, 379.02–379.05

[56] References Cited

U.S. PATENT DOCUMENTS 4,678,182   7/1987   Nakao et al. .
4,790,528  12/1988   Nakao et al. ........................ 482/9
4,817,938   4/1989   Nakao et al. ........................ 482/8 X
5,318,487   6/1994   Golen et al. ........................ 482/3 X Primary Examiner—Glenn E Richman
Attorney, Agent, or Firm—Armstrong, Westerman, Hattori, McLeland & Naughton

[57] ABSTRACT

An optimum workload corresponding to a target heart rate of an user is determined by the following method, which is preferably utilized for providing a safe training or an accurate examination of physical strength to the user. After the target heart rate is set, a first steady heart rate of the user is measured during an initial exercise cycle in which a first workload is applied to the user. The first workload is derived in accordance with the target heart rate and a statistically obtained workload versus heart rate correlation corresponding to at least one factor selected from the group consisting of the user's age, gender, body weight, and body height, etc. In addition, a second steady heart rate of the user is measured during at least one subsequent exercise cycle in which a second workload is applied to the user. The second workload is derived by entering as input parameters the applied workload and the measured heart rate at the immediately previous exercise cycle into a multiple variate model equation. Consequently, the optimum workload is determined by entering the applied workload and the measure heart rate at the last exercise cycle into the multiple variate model equation. The model equation is prepared by utilizing a neural network analysis or a multiple variate analysis.

26 Claims, 5 Drawing Sheets

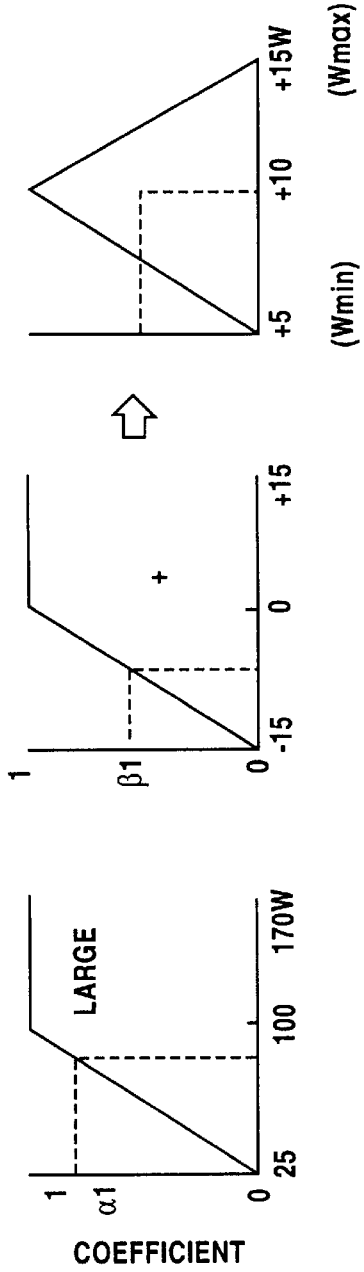
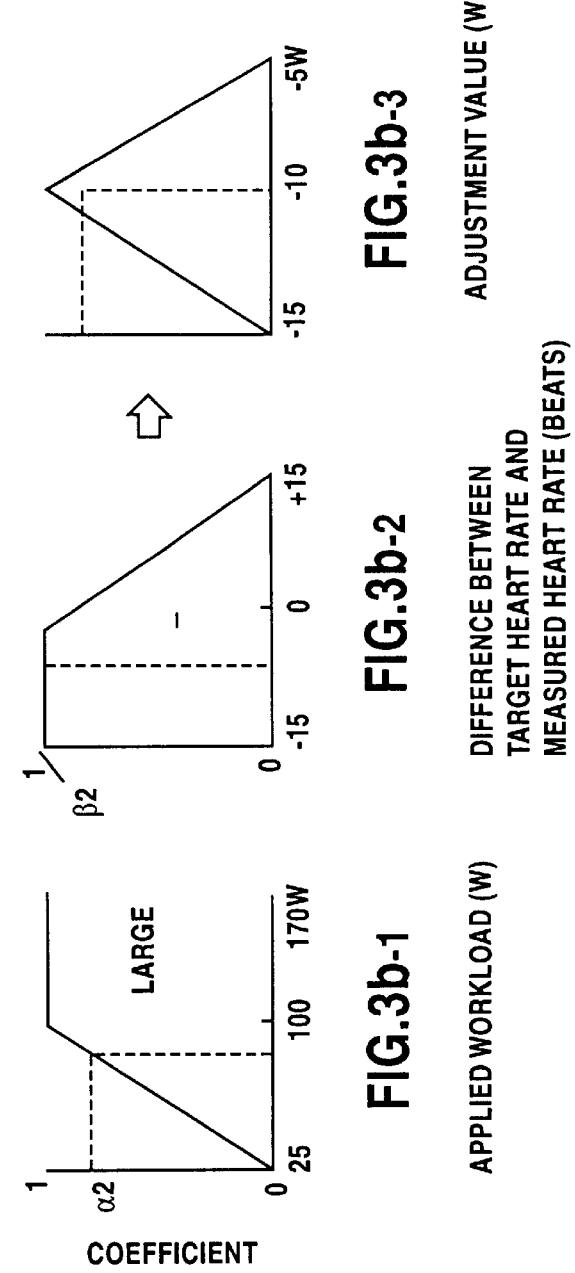

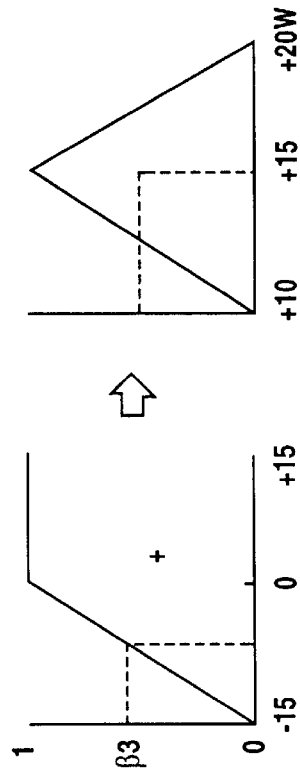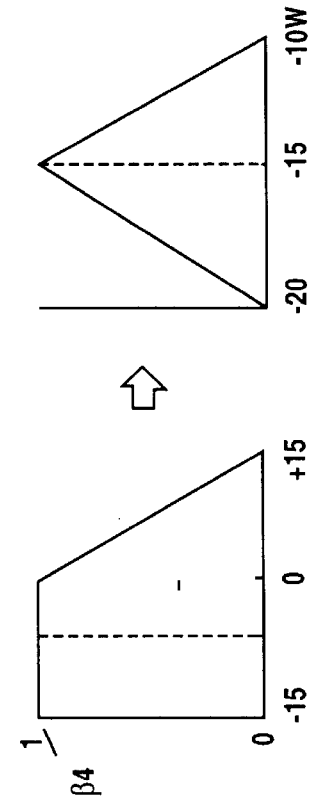

METHOD OF DETERMINING AN OPTIMUM WORKLOAD CORRESPONDING TO USER'S TARGET HEART RATE AND EXERCISE DEVICE THEREFOR

BACKGROUND OF THE INVENTION

1. Field of the Invention

The present invention relates to a method of determining an optimum workload corresponding to a target heart rate of an user, which is utilized for providing a safe training or an accurate examination of physical strength to the user, and an exercise device therefor.

2. Disclosure of the Prior Art

In the past, a treadmill exerciser for walking or running on a movable belt-like floor and a bicycle ergometer, etc., are used as an exercise device for a training or an examination of physical strength of an user. In the treadmill exerciser, a workload applied to the user is determined by controlling a moving speed and a slope of the belt-like floor. On the other hand, as shown in FIG. 4, the bicycle ergometer 1 comprises a pair of foot pedals 2, saddle 3, handle 4, sensor 5 for measuring a heart rate of the user during a pedaling thereof, and a workload controller 6 of the workload applied to the pedals 2. An exercise program of the bicycle ergometer 1 can be divided roughly into two categories. That is, one of the categories is that the workload applied to the pedals 2 is set by the user, and then the user pedals the ergometer for a required time period under the workload. The other one is that a target heart rate ($HR_{Target}$) is set by the user, and then the user pedals the ergometer for a required time period while the workload is controlled to reach and keep the target heart rate during the pedaling. In the earlier exercise program, the user usually pedals the ergometer for more than 10 minutes under the workload in the range of 40 to 120 W (watt) for the purpose of reducing the user's weight. On the other hand, in the later exercise program, the workload is usually set in accordance with a statistically obtained maximum heart rate ($HR_{max}$) corresponding to the user's age and gender, and body weight, etc. The maximum heart rate is represented by, for example, the following regression equations [1] and [2], $$\text{MALE: HRmax (beats/min)} = 209 - 0.69 \times \text{age} \quad [1]$$

$$\text{FEMALE: HRmax (beats/min)} = 205 - 0.75 \times \text{age}. \quad [2]$$

To be exact, the maximum heart rate is defined as a heart rate corresponding to a maximal oxygen uptake ($VO_{2max}$) taken in the body per 1 kg of the body weight and per 1 minute. In addition, the target heart rate ($HR_{Target}$) is usually determined in accordance with the following equation [3], $$HR_{Target} = (HR_{max} - HR_{normal}) \times EL/100 + HR_{normal} \quad [3]$$

wherein $HR_{normal}$ is a heart rate measured at rest, and EL is an exercise level (%) which is ordinarily selected from the range of 30% to 70%.

By the way, in the later exercise program, it is known that the workload is increased stepwise at a fixed rate, for example, 10 W per 30 sec., for reaching the target heart rate of the user, and in each step, a steady heart rate is measured by the sensor 5. However, since the workload is increased at the fixed rate in spite that each of the users has an individual physical strength, it causes a problem that the heart rate of the user having a low physical strength is reached to the target heart rate by pedaling the ergometer for a relatively short time period, and on the contrary, it takes a relatively long time period for reaching the heart rate of the user having a high physical strength to the target heart rate. Therefore, it is expected that such stepwise increasing of the workload at the fixed rate does not always provide an efficient training to the individual user. In addition, when the workload is increased stepwise at a raised rate, the efficient training would be provided to the user having the high physical strength. However, in case of the user having the low physical strength, there is a probability of causing a serious problem that since the next increased workload is applied to the user before the user's heart rate is reached to the steady heart rate corresponding to the applied workload, the user is made to pedal the ergometer under an excess workload. Generally, it is taught that it takes more than 3 minutes for measuring the steady heart rate in each step.

U.S. Pat. No. 4,678,182 discloses a training device using a bicycle ergometer and a method, in which the bicycle ergometer is used to obtain an optimum load value and a steady number of pulses per minute for the continuous exercise of the user.

SUMMARY OF THE INVENTION

A primary object of the present invention is to provide a method of determining an optimum workload corresponding to a target heart rate ($HR_{Target}$) of an user which is utilized for providing a safe and efficient training or an accurate examination of physical strength to the user. That is, after the target heart rate of the user is set, a first steady heart rate of the user is measured during an initial exercise cycle, in which a first workload is applied to the user. The first workload is derived in accordance with the target heart rate and a statistically obtained workload versus heart rate correlation corresponding to at least one factor selected from the group consisting of the user's age, gender, body weight, body height, and whole body fat, etc. In addition, a second steady heart rate of the user is measured during at least one subsequent exercise cycle in which a second workload is applied to the user. The second workload is derived by entering as input parameters the applied workload and the measured heart rate at the immediately previous exercise cycle into a first multiple variate model equation. The optimum workload is determined by entering the applied workload and the measured heart rate at the last exercise cycle into the first multiple variate model equation.

In the initial exercise cycle, it is possible that the first workload is derived by entering as input parameters at least two factors selected from the group consisting of the user's age, gender, body weight, body height, and whole body fat into an initial multiple variate model equation.

On the other hand, after the initial exercise cycle, it is further possible that the optimum workload is determined by entering the first workload and the first heart rate into the first multiple variate model equation.

It is also possible that the second workload is derived by multiplying an exercise level EL (%)/100 by a maximum aerobic capacity of the user which is predicted by entering as input parameters the applied workload and the measured heart rate at the immediately previous exercise cycle into a second multiple variate model equation, and also the optimum workload is determined by multiplying the exercise level EL (%)/100 by the maximum aerobic capacity predicted by entering the applied workload and the measured heart rate at the last exercise cycle into the second multiple variate model equation. The maximum aerobic capacity is defined as a maximum workload corresponding to a maximum heart rate ($HR_{max}$) of the individual user. The exercise level EL (%) is calculated by the equation [3'], that is, $$EL\ (\%)=100\times(HR_{Target}-HR_{Normal})/(HR_{max}-HR_{Normal}) \quad [3']$$

wherein $HR_{Normal}$ is a normal heart rate of the user measured at rest. It is preferred that the exercise level EL (%) is selected from the range of 30% to 80%. In this case, it is also preferred that the input parameters of the second model equation further include at least one factor selected from the group consisting of the user's age, gender, body height, body weight and whole body fat, integrated value of heart rate, integrated value of workload, workload applying time period, and the maximum aerobic capacity predicted at the immediately previous exercise cycle.

In addition, it is also possible that the second workload is derived by multiplying the exercise level EL (%)/100 by a maximum oxygen uptake of the user which is predicted by entering as input parameters the applied workload and the measured heart rate at the immediately previous exercise cycle into a third multiple variate model equation, and also the optimum workload is determined by multiplying the exercise level EL (%)/100 by the maximum oxygen uptake predicted by entering the applied workload and the measured heart rate at the last exercise cycle into the third multiple variate model equation. In this case, it is also preferred that the input parameters of the third model equation further include at least one factor selected from the group consisting of the user's age, gender, body height, body weight and whole body fat, integrated value of heart rate, integrated value of workload, workload applying time period, and the maximum oxygen uptake predicted at the immediately previous exercise cycle. Additionally, it is possible that the maximum aerobic capacity can be converted to the maximum oxygen uptake ($VO_{2max}$) by, for example, the following equation [4], $$VO_{2max}(ml/kg/min.)\times Body\ Weight(kg) =233+13.08\times Maximum\ Aerobic\ Capacity\ (W) \quad [4]$$

In case that there is a linear relationship between a target value, for example, the maximum aerobic capacity, and the input parameters, it is preferred that a multiple variate analysis selected from Multiple Regression Analysis, Multidimetional Quantification 1, and Group Method of Data Handling (GMDH), etc., is used for making each multiple variate model equation. For example, a general model equation [5] prepared by the multiple variate analysis is shown below, $$W=f(v1, v2\ldots, Vn) \quad [5]$$

wherein W is the target value, f is a multiple variate function, v1, v2, . . . vn are input parameters of the function, and n is the number of the input parameters.

On the other hand, in case that there is a non-linear relationship between the target value and the input parameters, it is also preferred that a neural network analysis is used for making each multiple variate model equation. For example, as shown in FIG. 1, a structure of the neural network analysis indicates that the optimum workload is determined through a plurality of hidden layers, each of which includes all kinds of the input parameters. For example, the relationship between the target value and the input parameters is represented by the following equations [6] to [10] according to the neural network analysis, $$W=1/(1+e^{-Z}) \quad [6]$$

W :target value
Z :value determined by the equation [7], $$Z = \Theta + \sum_{i=1}^{k} BiYi \quad [7]$$

Bi :coefficient
Θ:constant
k : the number of hidden layers
Yi :value determined by the equation [8], $$Yi=1/(1+e^{-Xi}) \quad [8]$$

Xi :value determined by the equation [9], $$Xi = \theta + \sum_{i=1}^{k} AiVi \quad [9]$$

Ai :coefficient
θ:constant
Vi :value normalized by the equation [10], $$Vi=(vi-vi_{MIN})/(vi_{MAX}-vi_{MIN}) \quad [10]$$

wherein vi is one of the input parameters, $vi_{MIN}$ is a minimum value of vi, and $vi_{MAX}$ is a maximum value of vi.

By the way, since it takes a relatively long operating time period in case of using the neural network analysis, it is preferred that, for example, a linear simplified equation [11] represented below is used for improving an operating speed, that is, $$W = C + \sum_{i=1}^{n} Divi \quad [11]$$

wherein C is a constant, Di is a coefficient peculiar to each input parameter, and n is the number of the input parameters.

Therefore, each multiple variate model equation is prepared by using the multiple variate analysis or the neural network analysis, and also experimental data obtained by a submaximum workload applying method which is a kind of examination of physical strength. In the present invention, for example, the experimental data were drawn from 70 healthy male and female subjects aged 20 to 60 years. In the submaximum workload applying method, a variable workload applied to the subject is increased stepwise, and in each step a steady heart rate of the subject is measured. After the final workload applying step, in which the heart rate of the subject reaches to the target heart rate, the $VO_2$max or maximum aerobic capacity of each subject is determined from a regression line prepared according to thus obtained workload versus heart rate relation. For reference, ages of the subjects categorized into five age ranges, and average heart rates corresponding to the exercise levels 40% to 80% of the subjects of each of the age ranges are listed in TABLE A.

TABLE A

| Exercise Level (%) | Average heart rate (beats/min.) in each age range (yr.) of subjects | | | | | Subjective Exercise Degree (20 yr.≦) |
|---|---|---|---|---|---|---|
| | ≦29 (yr.) | 30 ~ 39 (yr.) | 40 ~ 49 (yr.) | 50 ~ 59 (yr.) | 60≦ (yr.) | |
| 80% | 165 | 160 | 150 | 145 | 135 | 17 VERY HARD |
| | | | | | | 16 |
| 70% | 149 | 145 | 140 | 135 | 123 | 15 HARD |
| 60% | 137 | 133 | 129 | 125 | 115 | 14 |
| 50% | 124 | 122 | 119 | 115 | 107 | 13 SLIGHTLY HARD |
| 40% | 112 | 110 | 108 | 105 | 99 | |

It is also possible that a maximum workload applying method is utilized in place of the submaximum workload method. In the maximum workload applying method, the workload is increased stepwise, and in each step the steady heart rate of the subject is measured. After a maximum workload applying step, in which the subject could no longer continue despite verbal encouragement, the $VO_2$max or maximum aerobic capacity of each subject is determined. In addition, when an expiration analysis and the maximum workload applying method or the submaximum workload method are performed together for obtaining the experimental data, it is preferred for improving the accuracy of the multiple variate model equation.

It is also preferred that the workload applied to the user is timely adjusted during each exercise cycle in such a manner of a control table or a fuzzy control method for preventing the occurrence of a dangerous case in which the user is made to exercise for a long time period under an excess workload corresponding to a heart rate more than the target heart rate. That is, even if the excess workload is applied to the user in one of the exercise cycles, it is timely adjusted during the exercise cycle such that the long exercise of the user under the excess workload is prevented. The control table method is useful in case of a small number of input parameters. TABLE B shows a control table using as the input parameters a workload range and a difference between the target heart rate and a measured heart rate, in which the input parameters are respectively categorized into three ranges. For example, when the applied workload is in the range of "Medium" and the difference between the heart rates is in the range of "Small", an adjustment value $E_{21}$ is selected for adjusting the workload.

TABLE B

| Workload Range | ΔHR *1 | | |
|---|---|---|---|
| | Small | Medium | Large |
| Small | E11 | E12 | E13 |
| Medium | E21 | E22 | E23 |
| Large | E31 | E32 | E33 |

*1: ΔHR is a difference between the target heart rate and a measured heart rate at an exercise cycle
E11 to E33: Adjustment values In addition, the fuzzy control method is useful for adjusting the workload in case of a large number of the input parameters. The adjustment is performed by using membership functions with respect to input parameters of the fuzzy control method. It is preferred that input parameters of the fuzzy control method or the control table include the difference between the target heart rate and a measured heart rate, workload, and workload applying time period. On the other hand, it is further preferred that a control table prepared by analyzing the membership functions with "Min-Max" method or "Mean-Load" method is utilized for adjusting the workload.

In another preferred embodiment of the present invention, a modified workload, which is obtained by multiplying the workload derived in each exercise cycle by a safety coefficient of less than 1, is applied to the user for providing the safe training. Since the modified workload can be readily adjusted by slightly increasing the modified workload according to the fuzzy control method or the control table, the excess workload is not applied to the user in any case, so that it will provide the safe training and examination of physical strength to the user.

By utilizing the method of determining the optimum workload of the present invention, an examination of physical strength of the user can be proceeded, as explained below. At least two exercise levels (%) are preferably selected from the range of 30% to 80%, and a target heart rate corresponding to each exercise level is set. The optimum workload corresponding to each target heart rate is determined by the above method of the present invention to thereby obtain a workload versus heart rate regression line peculiar to the individual user. In case that the physical strength is defined as the maximum aerobic capacity of the user, it can be readily estimated by extrapolation of the regression line, as shown in FIG. 2.

Another object of the present invention is to provide an exercise device which applies a variable workload to an user thereof during a plurality of consecutive exercise cycles for obtaining an optimum workload corresponding to a target heart rate of the user. The exercise device comprises a sensor for monitoring the heart rate of the user, a setting unit for setting the target heart rate, a loading unit for applying to the user the variable workload comprising first and second workload, a first workload unit for deriving the first workload applied to the user in an initial exercise cycle in which a first steady heart rate is measured by the sensor, a second workload unit for deriving the second workload applied to the user in at least one subsequent exercise cycle in which a second steady heart rate is measured by the sensor, an optimum workload determination unit for determining the optimum workload. In the first workload unit, the first workload is derived in accordance with the target heart rate and a statistically obtained workload versus heart rate correlation corresponding to at least one factor selected from the group consisting of the user's age, gender, body weight, body height, and whole body fat. In the second workload unit, the second workload is determined by entering as input parameters the applied workload and the measured heart rate at the immediately previous exercise cycle into a multiple variate model equation. In addition, in the optimum workload determination unit, the optimum workload is determined by entering the applied workload and the measured heart rate at the last exercise cycle into the multiple variate model equation.

In a preferred embodiment of the present invention, in the first workload unit, the first workload is determined by entering as input parameters at least two factors selected from the group consisting of the target heart, age, gender, body weight, body height, and whole body fat into an initial multiple variate model equation.

Other features, objects and advantages of the present invention will become more apparent from the following description about the preferred embodiments taken with reference to the accompanied drawings.

BRIEF DESCRIPTION OF THE DRAWINGS

FIG. 3 shows explanatory graphs of membership functions utilized for a fuzzy control method in the present invention.

DETAILED DESCRIPTION OF THE PREFERRED EMBODIMENT

Figure 1:
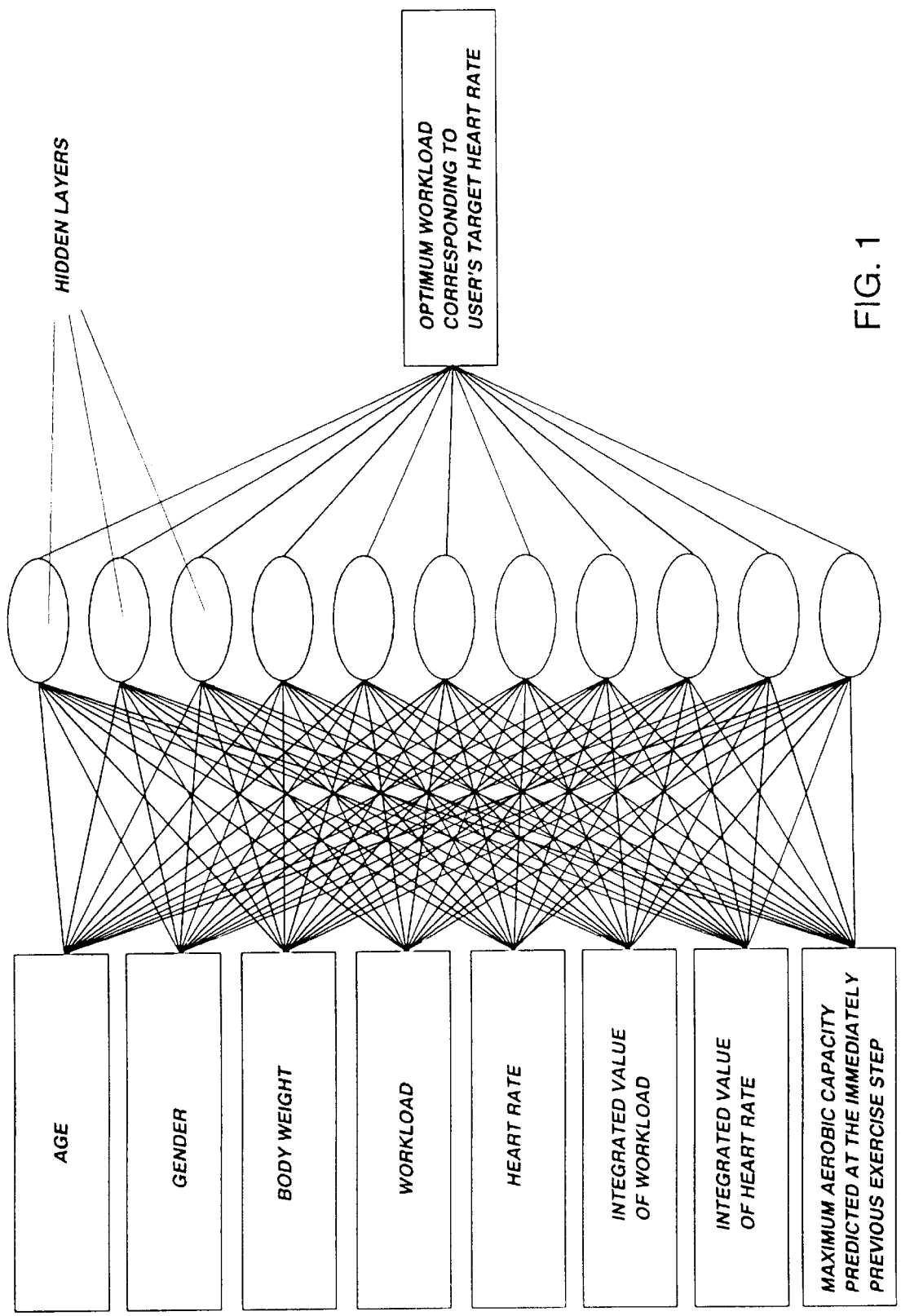
FIG. 1 shows a conceptional structure of a neural network analysis utilized in the present invention.
Figure 2:
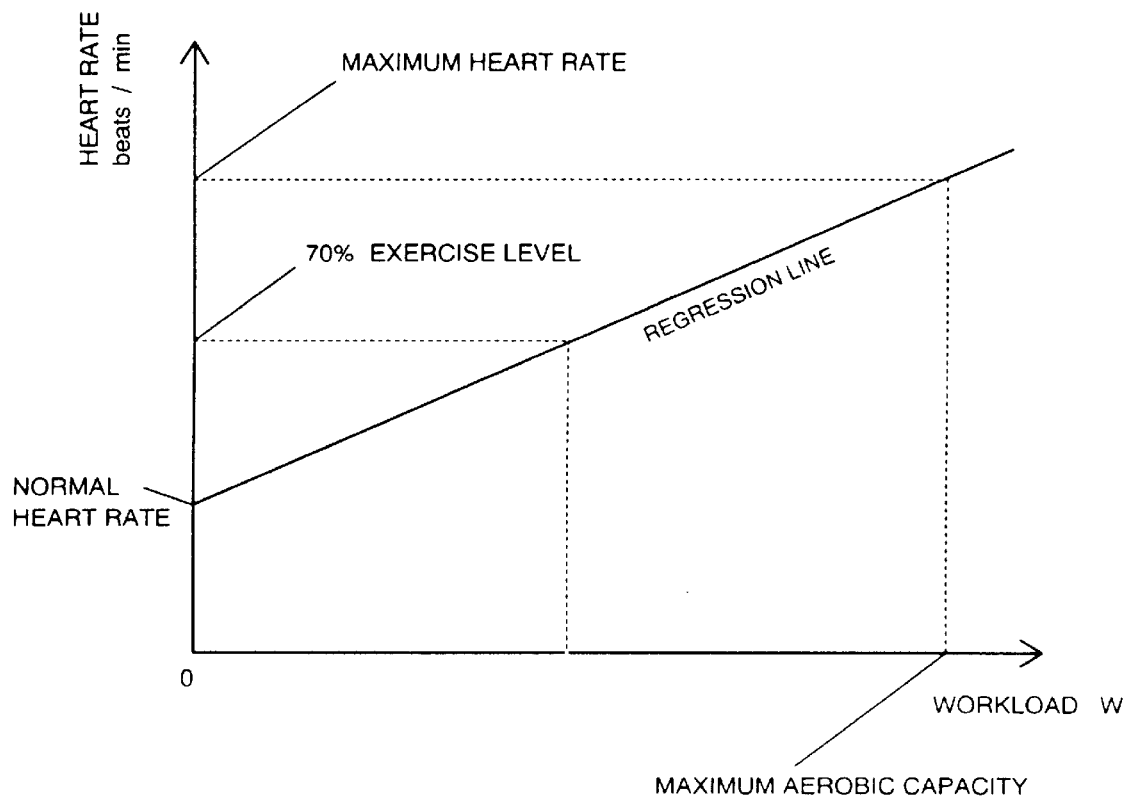
FIG. 2 is an explanatory graph indicating a workload versus heart rate regression line.
Figure 4:
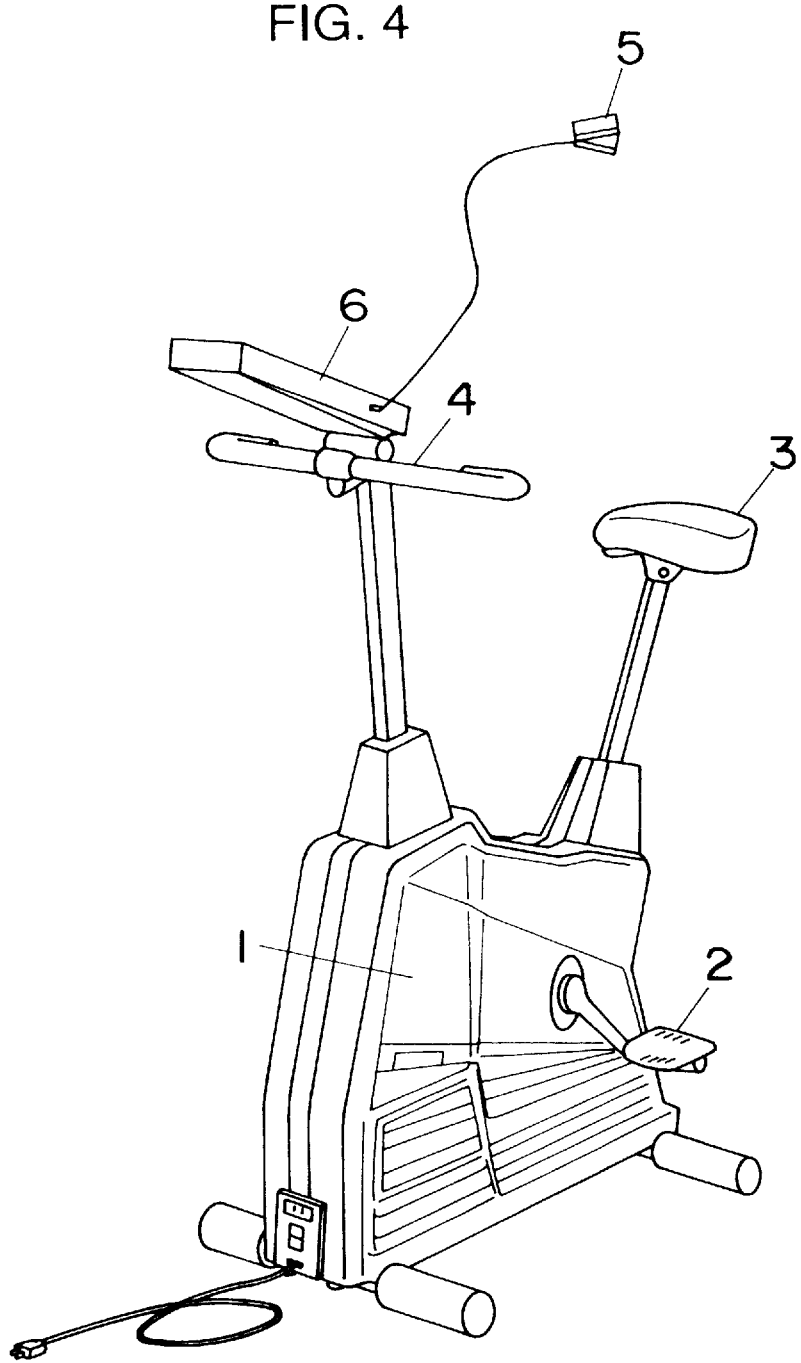
FIG. 4 is a perspective view of a bicycle ergometer.

In FIRST and SECOND EMBODIMENTS, an optimum workload corresponding to a target heart rate of an user is determined in accordance with the present method by a bicycle ergometer 1 which comprises a pair of foot pedals 2, saddle 3, handle 4, sensor 5 for measuring a heart rate of the user during a pedaling thereof, and a workload controller 6 of the workload applied to the pedals 2, as illustrated in FIG. 4. In THIRD to NINTH EMBODIMENTS, a physical strength of the user is examined by using the ergometer 1.

FIRST EMBODIMENT

A method of determining an optimum workload corresponding to a target heart rate of an user is explained below. The user is a healthy female subject aged 25 yr. having 45 kg of body weight and 152 cm of body height. A maximum heart rate ($HR_{max}$) of the user is obtained by the equation [2], and a normal heart rate ($HR_{Normal}$) thereof is measured at rest. An exercise level selected in this embodiment is 50% which is effective for the purpose of reducing the user's weight. Therefore, the target heart rate of the user is 124 beats/min, which is represented by the equation [3]. The method comprises four consecutive exercise cycles, and in each cycle, a heart rate of the user and a workload applied to the pedals 2 of the ergometer 1 are measured by the sensor 5, and also an integrated value of the heart rate and an integrated value of the workload are calculated. In the first exercise cycle, a first workload is applied to the user for 1 min. The first workload is derived by multiplying the exercise degree (%)/100, by a first maximum aerobic capacity which is predicted by entering as input parameters age, gender, body height and body weight of the user into a first multiple variate model equation. Subsequently, in the second exercise cycle, a second workload is applied to the user for 2 min. The second workload is derived by multiplying the exercise degree (%)/100 by a second maximum aerobic capacity which is predicted by entering as input parameters gender, age, body height, and body weight of the user, the integrated value, the measured heart rate and the applied workload at the immediately previous exercise cycle into a second multiple variate model equation. In the third exercise cycle, a third workload is applied to the user for 3 min. The third workload is derived by multiplying the exercise degree (%)/100 by a third maximum aerobic capacity which is predicted by entering the input parameters into the second model equation. After the third exercise cycle, a fourth workload is applied to the user for 14 min. The fourth workload is determined as the optimum workload by multiplying the exercise degree (%)/100 by a fourth maximum aerobic capacity which is predicted by entering the input parameters into the second model equation. Details of the FIRST EMBODIMENT are summarized on TABLE 1.

TABLE 1

| Exercise cycle | Workload applying time (min.) | Workload (W) | Maximum aerobic capacity (W) | Measured heart rate (beats/min.) | Difference between target and measured heart rates (%) *1 |
|---|---|---|---|---|---|
| 1 | 1 | 70 | 137.9 | 115 | 7.3 |
| 2 | 2 | 50 | 102.8 | 124 | 0.0 |
| 3 | 3 | 55 | 111.3 | 125 | 0.8 |
| 4 | 14 | 60 | 116.7 | *2 | — |

*1: Difference between the target heart rate ($HR_{Target}$) and a measured heart rate (HR) of the user is represented by the following equation
Difference (%) = | 100 × (HR − $HR_{Target}$) / $HR_{Target}$|
*2: In the fourth exercise cycle, the heart rate of the user was not measured.

SECOND EMBODIMENT

An optimum workload corresponding to a target heart rate of an user is determined by the substantially same method as FIRST EMBODIMENT except for the following. In this case, the user is a healthy male subject aged 19 yr. having 60 kg of body weight. A maximum heart rate ($HR_{max}$) of the user is obtained by the equation [1], and a normal heart rate ($HR_{Normal}$) thereof is measured at rest. An exercise level selected in this embodiment is 50%. Therefore, the target heart rate of the user is 124 beats/min, which is represented by the equation [3]. In addition, the first workload is determined from a statistically obtained data separately according to age and gender which is listed on TABLE 2, and is memorized in a memory of the workload controller 6 of the bicycle ergometer 1. Details of the SECOND EMBODIMENT are summarized on TABLE 3.

TABLE 2

| Range of age (yr.) | First workload (W) | |
|---|---|---|
| | Male | Female |
| <30 | 100 | 60 |
| 30 ~ 39 | 90 | 50 |
| 40 ~ 49 | 80 | 45 |
| 50 ~ 59 | 70 | 40 |
| 60< | 60 | 35 |

TABLE 3

| Exercise cycle | Workload applying time (min.) | Workload (W) | Maximum aerobic capacity (W) | Measured heart rate (beats/min.) | Difference between target and measured heart rates (%) |
|---|---|---|---|---|---|
| 1 | 1 | 100 | — | 110 | 11.3 |
| 2 | 2 | 110 | 219.6 | 117 | 5.6 |
| 3 | 3 | 115 | 227.5 | 122 | 3.2 |
| 4 | 14 | 140 | 280.8 | *1 | — |

*1: In the fourth exercise cycle, the heart rate of the user was not measured.

THIRD EMBODIMENT

A physical strength of an user is estimated as a maximum aerobic capacity thereof which is a maximum workload corresponding to a maximum heart rate of the user. The maximum heart rate is presented by the equation [1] or [2]. The maximum workload is determined by extrapolation of a workload versus heart rate regression line of the user. The regression line is prepared by the following method. That is, a variable workload is increased in five consecutive exercise steps, and in each exercise step, a heart rate of the user and a workload are measured. In the first exercise step, a first workload is applied to the user for 1 min. The first workload is determined by multiplying a first exercise level (%)/100 by a first maximum aerobic capacity which is predicted by entering as input parameters age, gender, and body weight of the user into a first multiple variate model equation. In each of the exercise steps 2 to 5, the workload applied to the user is determined by multiplying an exercise level (%)/100 of the exercise step by a maximum aerobic capacity which is predicted by entering as input parameters, age, gender, body weight, the measured heart rate, the applied workload and the predicted maximum aerobic capacity at the previous exercise step, integrated value of heart rate, integrated value of workload into a second multiple variate model equation. The exercise level (%) and a workload applying time in each exercise step are listed on TABLE 4. The total of the workload applying times is 16 min. From thus obtained data, the physical strength of the user is estimated by preparing the workload versus heart rate regression line, and determining the maximum workload corresponding to the maximum heart rate of the user by extrapolation of the regression line.

By the way, the second model equation used in the THIRD EMBODIMENT is prepared according to a neural network analysis and is made to learn 40,000 times with respect to statistically obtained data for improving accuracy of the predicted maximum aerobic capacity. In addition, the model equation is modified to a simplified model equation for improving an operating speed. Details of the THIRD EMBODIMENT are summarized on TABLE 4.

TABLE 4

| Exercise step | Workload applying time | Input parameters of a multiple variate model equation. | Exercise level (%) | Mean error (*1) |
|---|---|---|---|---|
| 1 | 1 min. | gender, age, and body weight | 30 | 26.7 |
| 2 | 3 min. | age, gender, body weight, the measured | 40 | 24.9 |
| 3 | 4 min. | heart rate, the applied workload and the | 50 | 24.1 |
| 4 | 4 min. | predicted maximum aerobic capacity at | 60 | 20.6 |
| 5 | 4 min. | the previous exercise step, integrated value of heart rate, integrated value of workload | 70 | 16.8 |

*1: A mean error (W (Watt)) of maximum aerobic capacity predicted in each exercise step against a maximum aerobic capacity determined by extrapolation of a workload versus heart rate regression line.

FOURTH EMBODIMENT

A physical strength of an user is estimated by the substantially same method as THIRD EMBODIMENT except that the first workload is selected from the range of 20 to 40 W in response to age and gender of the user, and the input parameters of the second multiple variate model equation are the applied workload and the measured heart rate at the immediately previous exercise step. Details of the FOURTH EMBODIMENT are summarized in TABLE 5.

TABLE 5

| Exercise step | Workload applying time | Input parameters of a multiple variate model equation | Exercise level (%) | Mean error (*1) |
|---|---|---|---|---|
| 1 | 1 min. | — | — | — |
| 2 | 3 min. | the measured heart rate and the applied | 40 | 48.4 W |
| 3 | 4 min. | workload at the immediately previous | 50 | 38.4 W |
| 4 | 4 min. | exercise step | 60 | 30.3 W |
| 5 | 4 min. |  | 70 | 19.6 W |

*1: A mean error (W (Watt)) of a maximum aerobic capacity predicted in each of the exercise steps 2 to 5 against a maximum aerobic capacity determined by extrapolation of a workload versus heart rate regression line

FIFTH EMBODIMENT

A physical strength of an user is estimated by the substantially same method as THIRD EMBODIMENT except that the first workload is derived from a maximum oxygen uptake predicted by entering as input parameters age, gender, and body weight of the user into a third multiple variate model equation, and also in each of the exercise steps 2 to 5, the workload applied to the user is derived from a maximum oxygen uptake predicted by entering as input parameters, age, gender, body weight, the measured heart rate, the applied workload and the predicted maximum oxygen uptake at the previous exercise step, integrated value of heart rate, integrated value of workload into a fourth multiple variate model equation. The maximum oxygen uptake ($VO_{2max}$) predicted in each step is converted to the maximum aerobic capacity by the equation [4], as described before.

Details of the FIFTH EMBODIMENT are summarized in TABLE 6.

TABLE 6

| Exercise step | Workload applying time | Input parameters of a multiple variate model equation. | Exercise level (%) | Mean-square-error (*1) |
|---|---|---|---|---|
| 1 | 1 min. | gender, age, and body weight | 30 | 15.0 |
| 2 | 3 min. | the measured heart rate, the applied | 40 | 13.1 |
| 3 | 4 min. | workload and the predicted maximum | 50 | 12.9 |
| 4 | 4 min. | oxygen uptake at the previous exercise | 60 | 12.0 |
| 5 | 4 min. | step, integrated value of heart rate, integrated value of workload | 70 | 12.0 |

*1: A mean-square-error of a maximum aerobic capacity converted from a maximum oxygen uptake predicted in each exercise step against a maximum aerobic capacity determined by extrapolation of a workload versus heart rate regression line

SIXTH EMBODIMENT

A physical strength of an user is estimated by the substantially same method as THIRD EMBODIMENT except that the first workload is derived from a maximum oxygen uptake predicted by entering as input parameters age, gender, and body weight of the user into a third multiple variate model equation, and in each of the exercise steps 2 to 5, the workload applied to the user is derived from a maximum oxygen uptake predicted by entering as input parameters, a classified age, gender, a classified body weight, the measured heart rate, the applied workload and the predicted maximum oxygen uptake at the previous exercise step, integrated value of heart rate, integrated value of workload into a fourth multiple variate model equation. In this embodiment, the age is divided into two categories consisting of an old group of 45 yr. or more and a young group of less than 45 yr. On the other hand, the body weight of the male user is divided into two categories consisting of a heavy group of 60 kg or more and a light group of less than 60 kg. In addition, the body weight of the female user is divided into two categories consisting of a heavy group of 50 kg or more and a light group of less than 50 kg. Details of the SIXTH EMBODIMENT are summarized in TABLE 7.

TABLE 7

| Exercise step | Workload applying time | Input parameters of a multiple variate model equation. | Exercise level (%) | Mean-square-error (*1) |
|---|---|---|---|---|
| 1 | 1 min. | gender, age, and body weight | 30 | 15.0 |
| 2 | 3 min. | a classified age, a classified body weight, gender, the measured heart rate, | 40 | 12.8 |
| 3 | 4 min. | weight, gender, the measured heart rate, | 50 | 12.6 |
| 4 | 4 min. | the applied workload and the predicted | 60 | 9.4 |
| 5 | 4 min. | maximum oxygen uptake at the previous exercise step, integrated value of heart rate, integrated value of workload | 70 | 8.7 |

*1: A mean-square-error of a maximum aerobic capacity converted from a maximum oxygen uptake predicted in each exercise step against a maximum aerobic capacity determined by extrapolation of a workload versus heart rate regression line

SEVENTH EMBODIMENT

A physical strength of an user is estimated by the substantially same method as THIRD EMBODIMENT except for the followings. The workload is timely and finely adjusted during each exercise step of THIRD EMBODIMENT by using, as a fuzzy control method, a control table prepared by analyzing membership functions with "Mean-Load" method. The adjustment is performed twice, that is, at 1 min. and 2 min. from the beginning of each exercise step.

For example, an analysis of the membership functions is briefly explained according to FIG. 3. When the workload applied to the user is, e.g., 90 W and a difference (beats) between the target heart rate and a measured heart rate of the user is, e.g., −8 beats at an exercise step, coefficient $\alpha 1$ and $\beta 1$ corresponding to the workload and the difference between the heart rates, respectively, are obtained from graphs (a)-I and II. A smaller one of the coefficients is multiplied by +10 (W) which is an average adjustment value ($\Delta_{Average}$), and is obtained by the following equation, $$\Delta_{Average} = (W_{max} + W_{min})/2,$$

wherein $W_{max}$ and $W_{min}$ are maximum and minimum adjustment values of the graphs (a)-III. In this case, since these coefficients $\alpha 1$ and $\beta 1$ are respectively about 0.8 and 0.5, 0.5 is multiplied by +10. Similar procedure is repeated with respect to graphs (b) to (d), so that an optimum adjustment value ($\Delta_{Optimum}$) in this case is represented by the following equation, $$\Delta Optimum = \frac{(\beta 1 \times 10 + \alpha 2 \times -10 + \beta 3 \times 15 + \alpha 4 \times -15)}{(\beta 1 + \alpha 2 + \beta 3 + \alpha 4)}$$

wherein $\alpha 1$ to $\alpha 4$ and $\beta 1$ to $\beta 4$ are coefficients obtained from the graphs (a)-I, II, (B)-I,II, (c)-I,II and (d)-I,II, and in the following relation, $\beta 1 < \alpha 1$, $\alpha 2 < \beta 2$, $\beta 3 < \alpha 3$, $\alpha 4 < \beta 4$. Therefore, the workload applied to the user, 90 (W), is adjusted to $90 + \Delta_{Optimum}$ (W) by the analysis of the membership functions.

As a result, even if an excess workload is applied to the user, it is adjusted adequately during the exercise step such that a long exercise of the user under the excess workload is prevented.

EIGHTH EMBODIMENT

A physical strength of an user is estimated by the substantially same method as SEVENTH EMBODIMENT except for the followings. That is, a modified workload, which is obtained by multiplying the workload derived in each exercise step of SEVENTH EMBODIMENT by a safety coefficient of less than 1, is applied to the user in each exercise step of EIGHTH EMBODIMENT, as listed on TABLE 8. In this case, since it can be readily adjusted only by increasing the modified workload according to the fuzzy control method, an excess workload is not applied to the user in any case, so that it will provide safe training and examination of physical strength to the user.

TABLE 8

| Exercise step | Workload applying time | Workload (W) |
|---|---|---|
| 1 | 1 min. | (first workload) × 0.7(safety coefficient) |
| 2 | 3 min. | (second workload) × 0.7(safety coefficient) |
| 3 | 4 min. | (third workload) × 0.7(safe coefficient) |
| 4 | 4 min. | (fourth workload) × 0.8(safe coefficient) |
| 5 | 4 min. | (fifth workload) × 0.9(safe coefficient) |

NINTH EMBODIMENT

A physical strength of an user is examined from a maximum oxygen uptake thereof. That is, a first workload is applied to the user for 1 min., and a first heart rate of the user is measured under the first workload. The first workload is determined by multiplying an exercise level (%)/100 by a first maximum oxygen uptake which is predicted by entering as input parameters age, gender, and body weight of the user into a first multiple variate model equation. In this embodiment, the exercise level is 30%. Subsequently, a second maximum oxygen uptake is predicted by entering as input parameters, age, gender, body weight, the first workload, the first heart rate, and the first maximum oxygen uptake into a second multiple variate model equation. The second maximum oxygen uptake is converted to a maximum aerobic capacity by the equation [4]. Thus obtained maximum aerobic capacity is determined as the physical strength of the user. By the way, the second multiple variate model equation is prepared according to a neural network analysis and is made to learn 40,000 times with respect to statistically obtained data for improving accuracy of the predicted maximum oxygen uptake. Details of the NINTH EMBODIMENT are summarized on TABLE 9.

TABLE 9

| Exercise step | Workload applying time | Input parameters of a multiple variate model equation. | Exercise level (%) | Mean-square-error (*1) |
|---|---|---|---|---|
| 1 | 1 min. | gender, age, and body weight | 30 | 15.0 |
| 2 | 0 min. | age, gender, body weight, the measured heart rate, the applied workload and the predicted maximum oxygen uptake at the previous exercise step | *2 | 12.7 |

*1: A mean-square-error of a maximum oxygen uptake predicted in each exercise step against a maximum oxygen uptake of the user examined by an expiration analysis.
*2: In the exercise step 2, second maximum oxygen uptake is predicted by the second multiple variate model equation. However, a workload derived from the second maximum oxygen uptake was not applied to the user.

What is claimed is:

1. A method of determining an optimum workload corresponding to a target heart rate of a user, said method comprising the steps of:

setting said target heart rate of the user;

measuring a steady heart rate of the user during an exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat; and entering input parameters including said first workload and the measured heart rate in said exercise cycle into a first multivariate model equation to thereby determine said optimum workload;

wherein said multivariate model equation is defined as a polynomial in said input parameters which is an expression involving a finite sum of terms of form $bx_1^{p1}x_2^{p2} \ldots x_m^{pm}$, where $x_1, x_2, \ldots x_m$ are said input parameters, b is some number, and $p1, p2, \ldots pm$ are integers.

2. A method of determining an optimum workload corresponding to a target heart rate of a user, said method comprising the steps of:

setting said target heart rate value of the user;

measuring a first steady heart rate of the user during a first exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat;

measuring a second steady heart rate of the user during at least one second exercise cycle, in which a second workload is applied to the user, said second workload being derived by entering input parameters including the applied workload and the measured heart rate at an immediately previous exercise cycle into a first multivariate model equation, said multivariate model equation being defined as a polynomial in said input parameters which is an expression involving a finite sum of terms of form $bx_1^{p1}x_2^{p2} \ldots x_m^{pm}$, where $x_1, x_2, \ldots x_m$ are said input parameters, b is some number, and $p1, p2, \ldots pm$ are integers; and entering said input parameters including the applied workload and the measured heart rate at the last second exercise cycle into said first model equation to thereby determine said optimum workload.

3. A method of determining an optimum workload corresponding to a target heart rate of a user, said method comprising the steps of:

setting said heart rate of the user;

measuring a steady heart rate of the user during an exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat; and determining said optimum workload from a maximum aerobic capacity defined as a maximum workload corresponding to a maximum heart rate peculiar to the user, said aerobic capacity being predicted by entering input parameters including said first workload and the measured heart rate at said exercise cycle into a first multivariate model equation, said multivariate model equation being defined as a polynomial in said input parameters which is an expression involving a finite sum of terms of form $bx_1^{p1}x_2^{p2} \ldots x_m^{pm}$, where $x_1, x_2, \ldots x_m$ are said input parameters, b is some number, and $p1, p2, \ldots pm$ are integers.

4. A method of determining an optimum workload corresponding to target heart rate of a user, said method comprising the steps of:

setting said heart rate of the user;

measuring a first steady heart rate of the user during a first exercise cycle, in which a first workload is applied to the user, said first workload being derived in accordance with said target heart rate and a statistically obtained workload versus heart rate corresponding to at least one factor selected from the group consisting of the user's age, gender, body weight, body height, and whole body fat;

measuring a second steady heart rate of the user during an at least one second exercise cycle, in which a second workload is applied to the user, said second workload being derived from a maximum aerobic capacity defined as a maximum workload corresponding to a maximum heart rate peculiar to the user, said aerobic capacity being predicted by entering input parameters including the applied workload and the measured heart rate at an immediately previous exercise cycle into a first multivariate model equation, said multivariate model equation being defined as a polynomial in said input parameters which is an expression involving a finite sum of terms of form $bx_1^{p1}x_2^{p2} \ldots x_m^{pm}$, where $x_1, x_2, \ldots x_m$, are said input parameters, b is some number, and $p1, p2, \ldots pm$ are integers; and determining said optimum workload from said maximum aerobic capacity predicted by entering said input parameters including the applied workload and the measured heart rate at the last second exercise cycle into said first model equation.

5. A method of determining an optimum workload corresponding to a target heart rate of a user, said method comprising the steps of:

setting said target heart rate of the user;

measuring a steady heart rate of the user during an exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat; and entering input parameters including said first workload and the measured heart rate in said exercise cycle into a first multivariate model equation to thereby determine said optimum workload;

wherein said multivariate model equation is defined as a polynomial in said input parameters, said polynomial being prepared by means of a neural network analysis characterized in that a plurality of hidden layers are set between said optimum workload and said input parameters to determine said optimum workload by using all of said hidden layers, each of which is determined by using all of said input parameters.

6. A method of determining an optimum workload corresponding to a target heart rate of a user, said method comprising the steps of:

setting said target heart rate value of the user;

measuring a first steady heart rate of the user during a first exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat;

measuring a second steady heart rate of the user during at least one second exercise cycle, in which a second workload is applied to the user, said second workload being derived by entering input parameters including the applied workload and the measured heart rate at an immediately previous exercise cycle into a first multivariate model equation, said multivariate model equation being defined as a polynomial in said input parameters, said polynomial being prepared by means of a neural network analysis characterized in that a plurality of hidden layers are set between said second workload and said input parameters to determine said second workload by using all of said hidden layers, each of which is determined by using all of said input parameters; and entering said input parameters including the applied workload and the measured heart rate at the last second exercise cycle into said first model equation to thereby determine said optimum workload.

7. A method of determining an optimum workload corresponding to a target heart rate of a user, said method comprising the steps of:

setting said target heart rate of the user;

measuring a steady heart rate of the user during an exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat; and determining said optimum workload from a maximum aerobic capacity defined as a maximum workload corresponding to a maximum heart rate peculiar to the user, said aerobic capacity being predicted by entering input parameters including said first workload and the measured heart rate at said exercise cycle into a first multivariate model equation;

wherein said multivariate model equation is defined as a polynomial in said input parameters, said polynomial being prepared by means of a neural network analysis characterized in that a plurality of hidden layers are set between said maximum aerobic capacity and said input parameters to determine said maximum aerobic capacity by using all of said hidden layers, each of which is determined by using all of said input parameters.

8. A method of determining an optimum workload corresponding to target heart rate of a user, said method comprising the steps of:

setting said target heart rate value of the user;

measuring a first steady heart rate of the user during a first exercise cycle, in which a first workload is applied to the user, said first workload being derived in accordance with said target heart rate and a statistically obtained workload versus heart rate corresponding to at least one factor selected from the group consisting of the user's age, gender, body weight, body height, and whole body fat;

measuring a second steady heart rate of the user during an at least one second exercise cycle, in which a second workload is applied to the user, said second workload being derived from a maximum aerobic capacity defined as a maximum workload corresponding to a maximum heart rate peculiar to the user, said aerobic capacity being predicted by entering input parameters including the applied workload and the measured heart rate at an immediately previous exercise cycle into a first multivariate model equation, said first model equation being defined as a polynomial in said input parameters, said polynomial being prepared by means of a neural network analysis characterized in that a plurality of hidden layers are set between said maximum aerobic capacity and said input parameters to determine said maximum aerobic capacity by using all of said hidden layers, each of which is determined by using all of said input parameters; and determining said optimum workload from said maximum aerobic capacity predicted by entering said input parameters including the applied workload and the measured heart rate at the last second exercise cycle into said first model equation.

9. A method of determining a physical strength of a user, said method comprising the steps of:

measuring a first steady heart rate of the user during a first exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat;

measuring a second steady heart rate of the user during at least one second exercise cycle, in which a second workload is applied to the user, said second workload being derived by multiplying an exercise level (%)/100 by a maximum aerobic capacity which is predicted by entering input parameters including the applied workload and the measured heart rate at an immediately previous exercise cycle into a first multivariate model equation, said multivariate model equation being defined as a polynomial in said input parameters which is an expression involving a finite sum of terms of form $bx_1^{p1} x_2^{p2} \ldots x_m^{pm}$, where $x_1, x_2, \ldots x_m$ are said input parameters, b is some number, and p1, p2, ... pm are integers; and preparing a regression line indicative of a workload versus heart rate relationship of the user in accordance with results of said first and second exercise cycles, to thereby determine a maximum workload corresponding to a maximum heart rate of the user as said physical strength.

10. A method of determining a physical strength of a user, said method comprising the steps of:

measuring a first steady heart rate of the user during a first exercise cycle, in which a first workload is applied to the user, said first workload being derived in accordance with said target heart rate and a statistically obtained workload versus heart rate correlation corresponding to at least one factor selected from the group consisting of the user's age, gender, body weight, body height, and whole body fat;

measuring a second steady heart rate of the user during at least one second exercise cycle, in which a second workload is applied to the user, said second workload being derived by multiplying an exercise level (%)/100 by a maximum aerobic capacity which is predicted by entering input parameters including the applied workload and the measured heart rate at an immediately previous exercise cycle into a first multivariate model equation, said first model equation being defined as a polynomial in said input parameters, said polynomial being prepared by means of a neural network analysis characterized in that a plurality of hidden layers are set between said maximum aerobic capacity and said input parameters to determine said maximum aerobic capacity by using all of said hidden layers, each of which is determined by using all of said input parameters, and preparing a regression line indicative of a workload versus heart rate relationship of the user in accordance with results of said first and second exercise cycles, to thereby determine a maximum workload corresponding to a maximum heart rate of the user as said physical strength.

11. A method as set forth in any one of claims 1–10, wherein said first workload is determined by entering as second input parameters at least two values selected from the group consisting of the user's age, gender, body weight, body height, and whole body fat, into a second multivariate model equation, said second model equation being defined as a polynomial in said second input parameters which is an expression involving a finite sum of terms of form $cy_1^{q1} y_2^{q2} \ldots y_n^{qn}$, wherein $y_1, y_2 \ldots Y_n$ are said second input parameters, c is some number, and q1,q2 ... qn are integers.

12. A method as set forth in any of claims 1–10, wherein said first workload is determined by entering as second input parameters at least two values selected from the group consisting of the user's age, gender, body weight, body height, and whole body fat into a second multivariate model equation, said second model equation being defined as a polynomial in said second input parameters which is prepared by means of a neural network analysis, said network analysis being characterized in that a plurality of hidden layers are set between said first workload and said second input parameters to determine said first workload by using all of said hidden layers, each of which is determined by using all of said second input parameters.

13. A method as set forth in any one of claims 1–8, wherein said target heart rate (HRtarget) is determined by the following equation, HRtarget=(HRmax−HRnormal)×EL (%)/100+HRnormal wherein HRnormal, HRmax and EL (%) are a normal heart rate of the user measured at rest, maximum heart rate of the user, and an exercise level, respectively.

14. A method as set forth in any one of claims 3, 4, 7 and 8, wherein each of said second workload and said optimum workload is determined by multiplying said maximum aerobic capacity by said exercise level (%)/100.

15. A method as set forth in any one of claims 2, 4, 6, and 8–10, wherein said second workload is adjusted by a fuzzy control method, in which said second workload is changed to an adjusted second-workload during said second exercise cycle, said adjusted second-workload being determined by using a membership function with respect to at least two factors selected from the group consisting of a difference between a target heart rate and the measured heart rate at said second exercise cycle, the applied workload at said second exercise cycle, and a workload applying time period.

16. A method as set forth in claim 15, wherein said adjusted second workload is determined by using a control table with respect to the applied workload at said second exercise cycle and the difference between said target heart rate and the measured heart rate at said second exercise cycle.

17. A method as set forth in any one of claims 9, 10, 13 and 14, wherein said exercise level (%) is selected from the range of 30 to 80.

18. A method as set forth in any one of claims 1–3, and 5–7, wherein said input parameters of said first model equation further include at least one value selected from the group consisting of the user's age, gender, body height, body weight, workload applying time period, integrated value of heart rate, integrated value of workload, and whole body fat.

19. A method as set forth in any one of claims 4, and 8–10, wherein said input parameters of said first model equation further include at least one value selected from the group consisting of the user's age, gender, body height, body weight, integrated value of heart rate, integrated value of workload, workload applying time period, predicted maximum aerobic capacity at an immediately previous exercise cycle, and whole body fat.

20. A method as set forth in claim 3, wherein said optimum workload is determined from a maximum oxygen uptake of the user predicted by entering said input parameters into a third multivariate model equation, and wherein said third model equation is defined as a third polynomial in said input parameters which is an expression involving a finite sum of terms of form $dx_1^{r1} x_2^{r2} \ldots x_n^{rn}$, wherein $x_1, x_2 \ldots x_n$ are said input parameters, d is some number, and r1,r2 ... rn are integers.

21. A method as set forth in claim 7, wherein said optimum workload is determined from a maximum oxygen uptake of the user predicted by entering said input parameters into a third multivariate model equation, and wherein said third model equation is defined as a polynomial in said input parameters which is prepared by means of said neural network analysis.

22. A method as set forth in claim 4, wherein each of said second workload and said optimum workload is derived from a maximum oxygen uptake of the user predicted by entering said input parameters into a third multivariate model equation, said third model equation being defined as a polynomial in said input parameter which is an expression involving a finite sum of terms of form $dx_1^{r1} x_2^{r2} \ldots x_n^{rn}$, wherein $x_1, x_2 \ldots x_n$ are said input parameters, d is some number, and r1,r2 ... rn are integers.

23. A method as set forth in claim 8, wherein each of said second workload and optimum workload is derived from a maximum oxygen uptake of the user predicted by entering said input parameters into a third multivariate model equation, said third model equation being defined as a polynomial in said input parameters which is prepared by means of said neural network analysis.

24. A method as set forth in claim 23, wherein said input parameters of said third model equation further include at least one value selected from the group consisting of the user's age, gender, body height, body weight, integrated value of heart rate, integrated value of workload, workload applying time period, predicted maximum oxygen uptake at an immediately previous exercise cycle, and whole body fat.

25. A method as set forth in any one of claims 1, 3, 5 and 7, wherein a modified workload, which is obtained by multiplying said first workload by a safety coefficient less than 1, is applied to the user in said exercise cycle.

26. A method as set forth in any one of claims 2, 4, 6 and 8, wherein a first modified workload, which is obtained by multiplying said first workload by a first safety coefficient less than 1, is applied to the user in said first exercise cycle, and wherein a second modified workload, which is obtained by multiplying said second workload by a second safety coefficient less than 1, is applied to the user in said second exercise cycle.

* * * * *